(12) United States Patent
Rabovitser et al.

(10) Patent No.: US 8,733,109 B2
(45) Date of Patent: May 27, 2014

(54) COMBINED FUEL AND AIR STAGED POWER GENERATION SYSTEM

(75) Inventors: Iosif K. Rabovitser, Skokie, IL (US); John M. Pratapas, Naperville, IL (US); Dmitri Boulanov, Buffalo Grove, IL (US)

(73) Assignee: Gas Technology Institute, Des Plaines, IL (US)

( * ) Notice: Subject to any disclaimer, the term of this patent is extended or adjusted under 35 U.S.C. 154(b) by 1094 days.

(21) Appl. No.: 12/748,908

(22) Filed: Mar. 29, 2010

(65) Prior Publication Data
US 2011/0232292 A1 Sep. 29, 2011

(51) Int. Cl.
*F02C 6/00* (2006.01)
*F02C 3/20* (2006.01)

(52) U.S. Cl.
USPC .... 60/780; 60/39.181; 60/39.182; 60/39.183; 60/781

(58) Field of Classification Search
USPC ................ 60/780, 781, 39.461, 39.464, 736, 60/39.181, 39.182, 39.183, 39.5, 39.12, 60/39.15
See application file for complete search history.

(56) References Cited

U.S. PATENT DOCUMENTS

| 2,675,672 | A | 4/1954 | Schorner |
| 6,609,582 | B1 | 8/2003 | Botti et al. |
| 7,421,835 | B2 * | 9/2008 | Rabovitser et al. .......... 60/39.12 |
| 2005/0144961 | A1 * | 7/2005 | Colibaba-Evulet et al. .... 60/780 |

* cited by examiner

*Primary Examiner* — William H Rodriguez
*Assistant Examiner* — Karthik Subramanian
(74) *Attorney, Agent, or Firm* — Pauley Petersen & Erickson

(57) ABSTRACT

A method and apparatus for generation of electric power employing fuel and air staging in which a first stage gas turbine and a second stage partial oxidation gas turbine power operated in parallel. A first portion of fuel and oxidant are provided to the first stage gas turbine which generates a first portion of electric power and a hot oxidant. A second portion of fuel and oxidant are provided to the second stage partial oxidation gas turbine which generates a second portion of electric power and a hot syngas. The hot oxidant and the hot syngas are provided to a bottoming cycle employing a fuel-fired boiler by which a third portion of electric power is generated.

29 Claims, 4 Drawing Sheets

COMBINED FUEL AND AIR STAGED POWER GENERATION SYSTEM

The U.S. Government has a paid-up license in this invention and the right in limited circumstances to require the patent owner to license others on reasonable terms as provided for by the terms of Contract No. DE-FC26-05NT42649 awarded by the U.S. Department of Energy.

BACKGROUND OF THE INVENTION

1. Field of the Invention

This invention relates to a method and apparatus for power generation. In one aspect, this invention relates to the use of gas turbines for electric power generation. In one aspect, this invention relates to the use of partial oxidation gas turbines for power generation. In one aspect, this invention relates to a method and apparatus for power generation employing fuel and air staging.

2. Description of Related Art

Gas turbines are one of the major sources for power generation in use today. However, the best efficiency for gas turbine power generation achieved to date by single cycle conventional gas turbines is only about 38%. One significant drawback of using gas turbines is that a significant portion, approximately 62-75%, of the fuel energy input to the gas turbines is lost in the turbine exhaust. This exhaust energy is in the form of thermal energy only, which makes it difficult to use for effective power generation. Staged reheat gas turbines have the capability to improve efficiency and, in some gas turbines, fuel staging has been employed, resulting in improvements to system efficiency.

A combined cycle is characteristic of a power producing engine or plant that employs more than one thermodynamic cycle. In a combined cycle power plant or combined cycle gas turbine plant, a gas turbine generator generates electric power and the waste heat is used in a bottoming cycle to make steam to generate additional electric power by means of a steam turbine, thereby enhancing the overall efficiency of the electric power generation. At present, net plant efficiency for conventional gas turbine combined cycles is about 58-59% of the lower heating value (LHV), and additional increases in efficiency are limited by several factors. Firstly, gas turbines are operated conventionally with large amounts of excess air, and significant amounts of thermal energy are transferred from the gas turbine exhaust to the bottoming cycle. Secondly, gas turbine exhaust temperatures usually do not exceed 1100° F., which restricts the superheated steam temperature obtainable in the bottoming cycle and, thus, limits the efficiency of the bottoming cycle to about 35-37%. Thirdly, air and/or fuel recuperation is not applied conventionally in combined cycles because the effect of recuperation is to reduce the temperature of the flue gases entering the bottoming cycle, thereby significantly decreasing the bottoming cycle efficiency as well as the overall system efficiency.

U.S. Pat. No. 2,675,672 teaches a gas turbine plant employing fuel and air staging. Fuel staging is performed in series where 100% of the fuel is supplied to a gas producer from which a portion of the gaseous fuel is supplied to a first topping stage and another portion of the fuel is supplied to a second stage combustion process. Both stages are complete combustion stages; however, power is generated only from the second stage. U.S. Pat. No. 6,609,582 teaches a power generation system and method employing a hybrid electric powertrain having an engine configured to produce reformate to feed a solid oxide fuel cell. The system employs air staging in series, but no fuel staging. See also U.S. Pat. No. 7,421,835 which teaches an air-staged reheat power generation system. None of these systems can provide a combined cycle having efficiencies greater than 60% because there are no provisions for high temperature steam superheating and, therefore, high efficiency in the bottoming cycle cannot be achieved.

SUMMARY OF THE INVENTION

Accordingly, it is one object of this invention to provide a method and system for generating electric power employing combined cycles having net plant efficiencies greater than the efficiencies of conventional combined cycle systems, i.e. efficiencies greater than 60%.

This and other objects of this invention are addressed by an apparatus for generation of electric power comprising a gas turbine and a partial oxidation gas turbine working in parallel in which portions of a fuel, typically a liquid fuel or a gaseous fuel, such as natural gas, and an oxidant, typically, but not necessarily, air, are supplied to the gas turbine for complete combustion, thermal expansion, and power generation. The exhaust from the gas turbine, which comprises products of complete combustion having an oxygen content of about 14%, is used as a hot oxidant in the system. A second portion of the fuel and a second portion of the oxidant are provided to the partial oxidation gas turbine in which combustion is carried out under substoichiometric conditions, resulting in thermal expansion, power generation, and the production of a syngas exhaust. The syngas exhaust from the partial oxidation gas turbine is an $H_2$-enriched fuel gas, typically comprising primarily $H_2$ and CO with lesser amounts of other components, such as $CO_2$ and methane, and is used as a hot secondary fuel in the apparatus. The hot oxidant from the gas turbine and the hot syngas from the partial oxidation gas turbine are provided to a fuel-fired boiler in a steam bottoming cycle for power generation. Due to the availability of high temperature heat resulting from the combustion of the hot syngas with the hot oxidant in the bottoming cycle, combustion air preheating and high temperature steam superheating may be employed to increase system performance, that is, power production and efficiency. Efficiency, that is, total system efficiency, is calculated as the net useful total power output divided by the total fuel input.

In accordance with one embodiment of this invention, 100% of the fuel is provided to a gas turbine in which the combustion unit is a two-stage combustor comprising a partial oxidation reactor (POR) in the first stage and a complete combustion reactor in the second stage. In accordance with this embodiment, hydrogen produced in the first stage partial oxidation reactor is separated from the partial oxidation reactor exhaust by appropriate $H_2$-separation means, such as a $H_2$-selective membrane, and used as a fuel in the partial oxidation gas turbine.

In accordance with another embodiment of this invention, oxygen-deficient air, that is, air in which the amount of oxygen is less than 21%, is provided to both the first stage gas turbine and the second stage partial oxidation gas turbine. By virtue of this arrangement, steam usage for temperature control and cooling of the second stage partial oxidation gas turbine may be significantly reduced, and emissions from the gas turbine exhaust from the first stage gas turbine may be reduced.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

Figure 1:
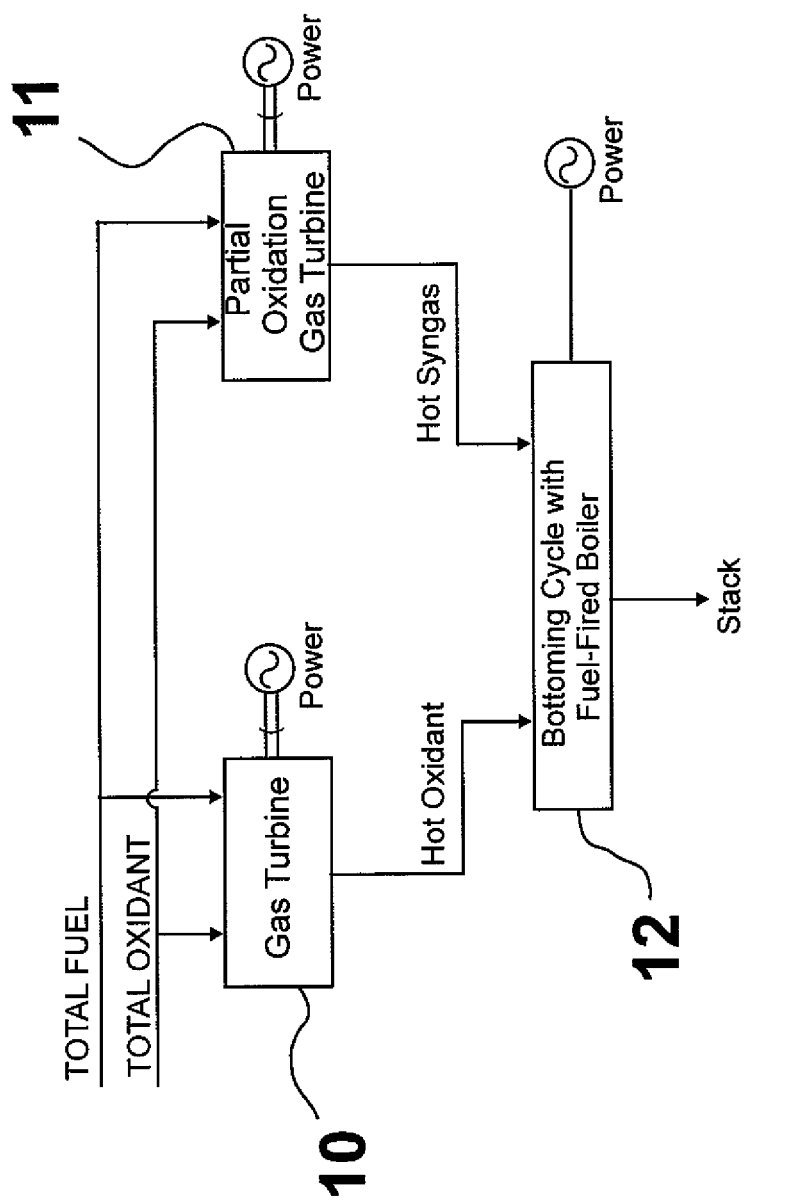
FIG. 1 is a schematic diagram showing the basic components of an apparatus in accordance with one embodiment of this invention.

The invention claimed herein is a combined fuel and air staged power generation system and method, as shown in FIG. 1, in which a first portion of a fuel and a first portion of an oxidant are provided to a first stage gas turbine 10 having a first stage oxidant inlet and a first stage fuel inlet, which produces power and hot oxidant, and in which a second portion of the fuel and a second portion of the oxidant are provided to a second stage partial oxidation gas turbine 11 having a second stage oxidant inlet and a second stage fuel inlet, which produces power and a hot syngas. The hot oxidant exiting gas turbine 10 through a hot oxidant outlet and the hot syngas exiting partial oxidation gas turbine 11 through a hot syngas outlet are provided to a bottoming cycle 12 comprising a fuel-fired boiler, which generates additional power. As used herein, the term "hot oxidant" refers to an oxidant having a temperature greater than about 950° F. As used herein, the term "hot syngas" refers to a synthesis gas having a temperature greater than about 1000° F. The fuel and air are split between the first stage gas turbine and the second stage partial oxidation gas turbine in such a way that in the first stage gas turbine, the air/fuel ratio is about 2.5-3.0 of a stoichiometric ratio for the fuel, and in the second stage partial oxidation gas turbine the air/fuel ratio is about 0.3-0.6 of the stoichiometric ratio for the fuel. Given the fact that a partial oxidation gas turbine has a lower power to fuel ratio as a result of the incomplete combustion of the fuel compared with the power to fuel ratio of a conventional gas turbine, it is surprising that the apparatus of this invention produces a higher efficiency than conventional combined cycle gas turbine systems.

Figure 2:
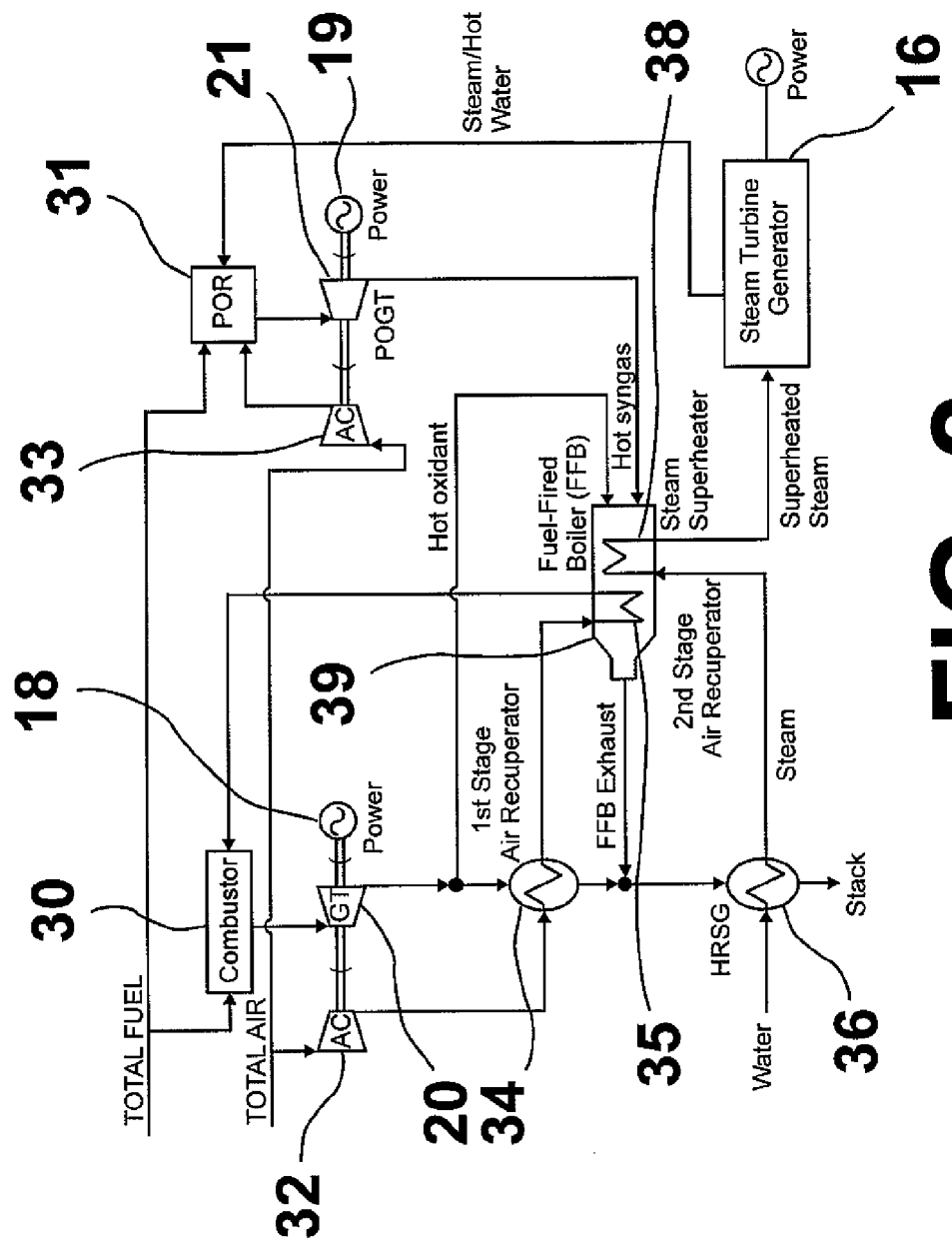
FIG. 2 is a more detailed schematic diagram of the apparatus in accordance with one embodiment of this invention.

The major components of the gas turbine-partial oxidation gas turbine combined cycle apparatus of this invention are shown in FIG. 2. As shown therein, the first stage gas turbine is a conventional gas turbine comprising an air compressor 32, a complete combustion, as opposed to partial oxidation, combustor 30, and an expansion turbine 20 utilizing the combustion products from combustor 30 as a working fluid. The second stage partial oxidation gas turbine comprises an air compressor 33, a partial oxidation reactor or combustor 31, and an expansion turbine 21 utilizing partially combusted products as a working fluid. Both the gas turbine and partial oxidation gas turbine are connected to generators 18, 19 to produce electric power. Exhaust, i.e. hot oxidant, from the first stage gas turbine is split into two portions, one of which is provided to a first stage oxidant recuperator 34 and the other of which is provided to a fuel-fired boiler 39 to which exhaust, i.e. hot syngas, from the partial oxidation gas turbine is also provided. Complete combustion occurs in the fuel-fired boiler, producing high temperature combustion products for high temperature steam generation 38 as well as second stage air preheating 35. Exhaust gas from the first stage gas turbine, having been partially cooled in the first stage oxidant recuperator 34, is mixed with the exhaust, i.e. products of complete combustion, from the fuel-fired boiler, producing a mixture which is provided to a heat recovery steam generator 36 for steam generation utilizing the available thermal energy. A portion or all of the steam from the heat recovery steam generator is provided to the fuel-fired boiler for high-temperature superheating, producing superheated steam having a temperature greater than about 1150° F. Both the heat recovery steam generator and the fuel-fired boiler are components of the bottoming cycle in which power is produced by means of a steam turbine generator 16.

Figure 3:
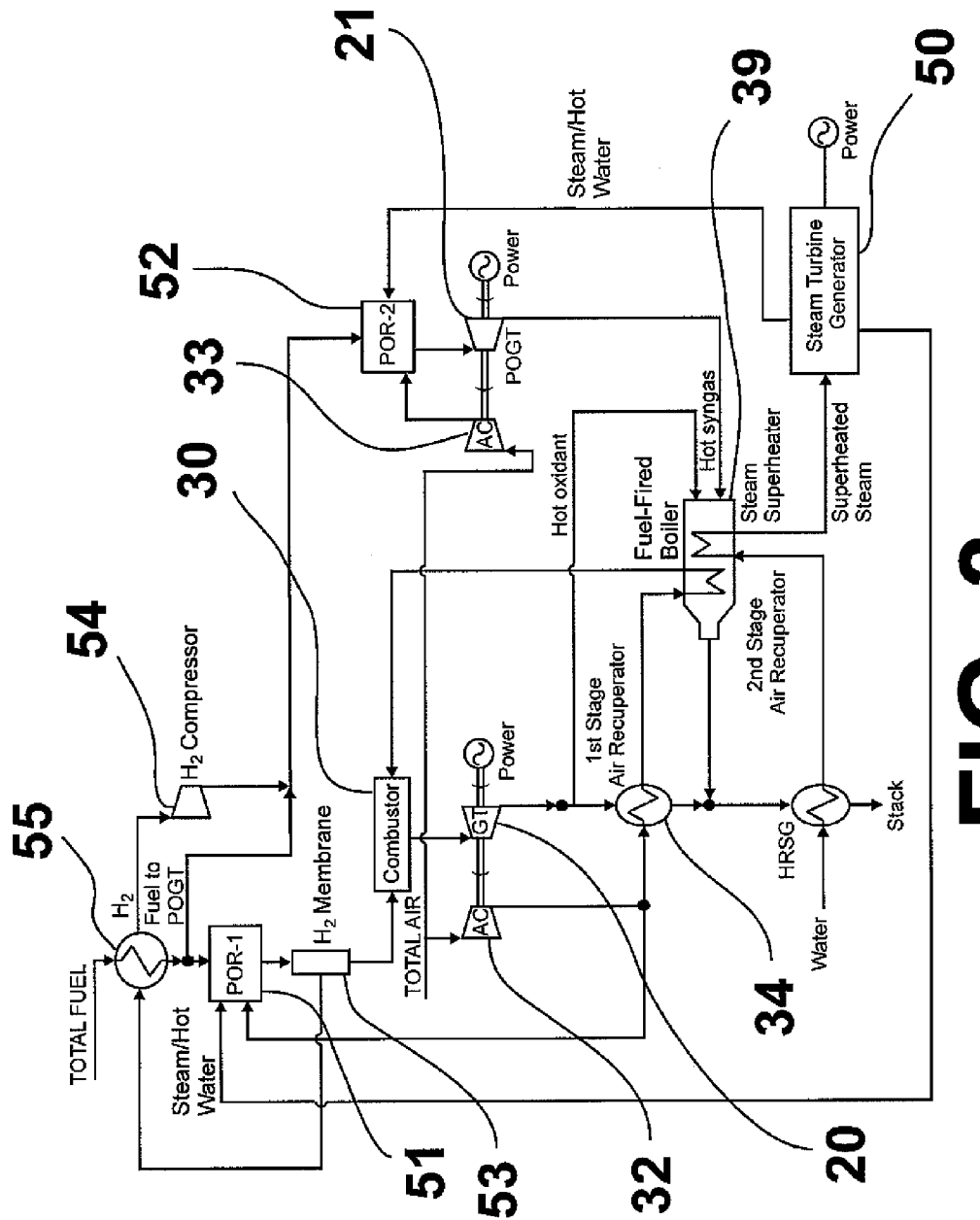
FIG. 3 is a schematic diagram of the apparatus in accordance with one embodiment of this invention in which hydrogen produced in the first stage gas turbine is supplied to the second stage partial oxidation gas turbine.

FIG. 3 shows a gas turbine-partial oxidation gas turbine combined cycle apparatus in accordance with one embodiment of this invention in which the first stage gas turbine comprises air compressor 32, complete combustion combustor 30, a partial oxidation reactor 51, and an expansion turbine 20. Fuel is provided to partial oxidation reactor 51 in which a hot syngas comprising hydrogen is produced. The hot syngas is provided to a hydrogen membrane separator 53 in which the hydrogen is separated from the hot syngas for use in a second partial oxidation reactor 52 and the remaining portion of the hot syngas is provided to complete combustion combustor 30. It will be appreciated by those skilled in the art that other $H_2$-separation means are known which may be used for hydrogen separation, and such other means are deemed to be within the scope of this invention. The complete combustion products exiting combustor 30 are provided to the first stage gas turbine. The separated hydrogen is partially cooled in heat exchanger 55, compressed, if necessary, in hydrogen compressor 54, and supplied to the partial oxidation gas turbine, which operates in parallel with the first stage gas turbine. Steam/hot water from the bottoming cycle are provided for cooling to a second stage partial oxidation reactor 52 and the first stage partial oxidation reactor 51.

Figure 4:
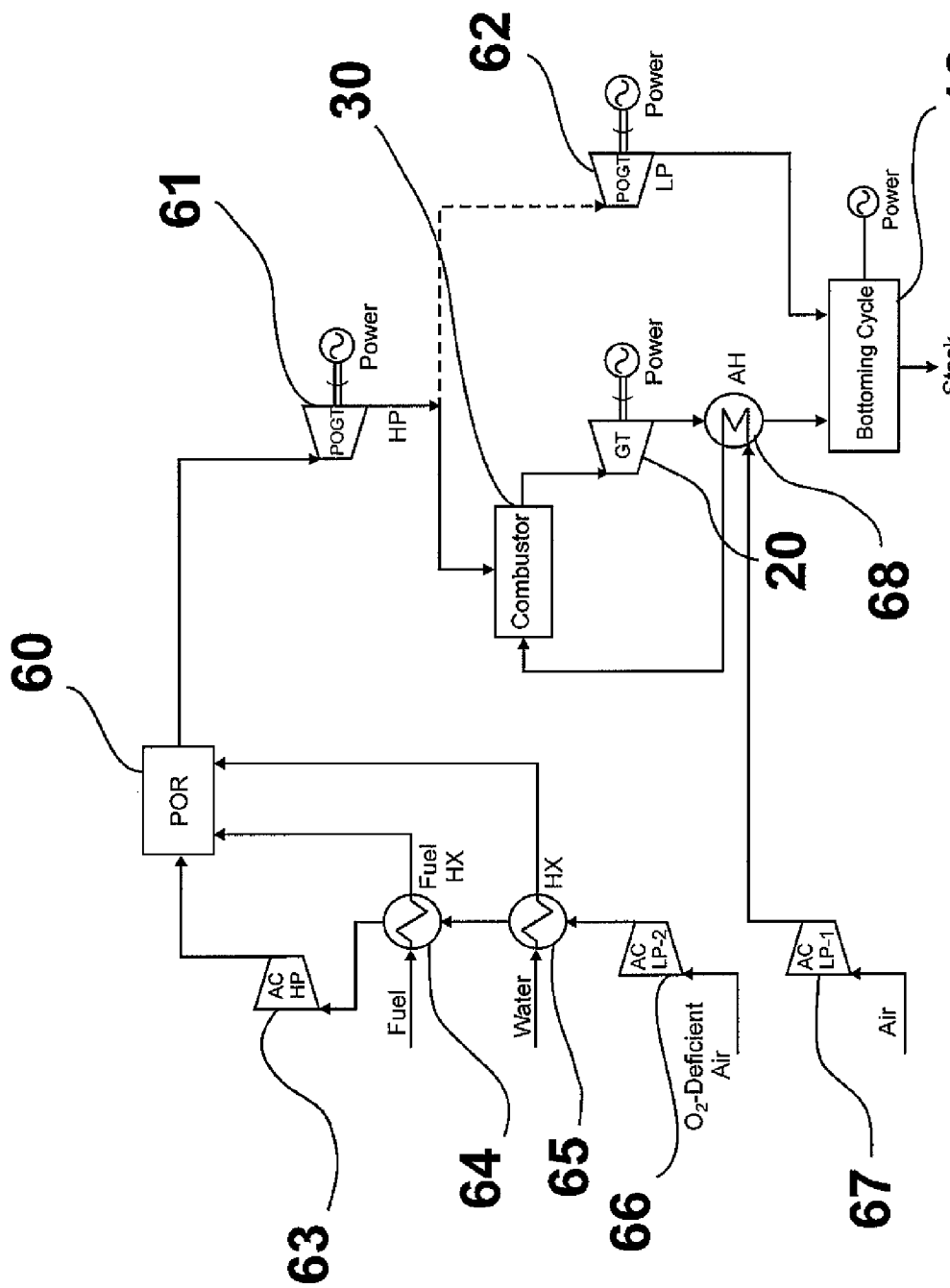
FIG. 4 is a schematic diagram of the system in accordance with one embodiment of this invention in which the gas turbine and the partial oxidation gas turbine are connected in series and oxygen-deficient air is used in the partial oxidation gas turbine.

FIG. 4 shows another embodiment of the apparatus of this invention in which the partial oxidation gas turbine and gas turbine are connected in series and $O_2$-deficient air is used in the partial oxidation gas turbine. As shown, the partial oxidation gas turbine comprising partial oxidation reactor 60 and a high pressure expansion turbine 61 is connected in series with the gas turbine comprising combustor 30 and expansion turbine 20. In accordance with one embodiment, a low pressure partial oxidation gas turbine 62 is connected in parallel with the gas turbine, resulting in a mixed, series-parallel combined cycle. In operation, oxygen-deficient air is compressed by low pressure compressor 66, producing compressed air, which is provided to water heat exchanger 65 in which the compressed air is primarily cooled by the steam/water from bottoming cycle 12 and the cooled compressed air is provided to fuel heat exchanger 64 in which fuel provided to the heat exchanger is heated and the compressed air is secondarily cooled. The cooled air is provided to a high-pressure air compressor 63 in which it is compressed and from which the compressed air is provided to partial oxidation reactor 60. The preheated fuel from fuel heat exchanger 64 is also provided to partial oxidation reactor 60 and the preheated water from water heat exchanger 65 is provided to partial oxidation reactor 60 for controlling the temperature of the partial oxidation products, that is, syngas, produced in the partial oxidation reactor so as to maintain the temperature in the range of about 2200-2500° F. The hot syngas is then provided for expansion to expansion turbine 61, resulting in the generation of power and pressurized syngas. Air compressed by low pressure air compressor 67 is preheated in air heater 68 and provided to combustor 30 along with the syngas from expansion turbine 61. The products of combustion from combustor 30 are provided to expansion turbine 20 for generation of electric power. From expansion turbine 20, the products of combustion are provided to air heater 68 for preheating the low pressure compressed air provided to combustor 30, resulting in cooler combustion products which are provided to bottoming cycle 12. In accordance with one embodiment, a portion of the exhaust from expansion turbine 61 is provided to low pressure partial oxidation gas turbine 62 for generation of additional power; and the remaining portion of syngas from partial oxidation gas turbine 62 is provided to bottoming cycle 12.

Table 1 shows the calculated results of the major performance parameters of one embodiment of the gas turbine-partial oxidation gas turbine combined cycle as shown in FIG. 2. A Siemens model SGT-6000G turbine was used for the gas turbine and a Siemens model SGT-400 turbine converted to a partial oxidation gas turbine mode of operation was used as the partial oxidation gas turbine. In one operation of the cycle, normal air and steam cooling are used in the partial oxidation gas turbine.

TABLE 1

| Combined Cycle, POGT-GT in parallel, O2 = 21% and steam cooling | | | | |
|---|---|---|---|---|
| SGT-6000 | NG input | | lb/hr | 83,552 |
| | | | Btu/hr(HHV) | 1,994,151,778 |
| | | | Btu/hr(LHV) | 1,797,122,416 |
| | | | MW (LHV) | 527 |
| | Air input | | lb/hr | 4,529,718 |
| | TIT | | F. | 2415 |
| | Pressure ratio | | — | 19.1 |
| | GT flowrate | | lb/hr | 4,171,097 |
| | Exhaust temperature | | F. | 1,031 |
| | Expander work | | MW | 492 |
| | Compressor work | | MW | 249 |
| | Net power | | MW | 243 |
| SGT-400 POGT | NG input | | lb/hr | 20,890 |
| | | | Btu/hr(HHV) | 498,587,799 |
| | | | Btu/hr(LHV) | 449,325,533 |
| | | | MW (LHV) | 132 |
| | Air input | | lb/hr | 178,118 |
| | Total steam flow | | lb/hr | 54,181 |
| | TIT | | F. | 2278 |
| | Pressure ratio | | — | 16.2 |
| | POGT flowrate | | lb/hr | 233,738 |
| | Exhaust temperature | | F. | 1,036 |
| | Expander work | | MW | 32 |
| | Compressor work | | MW | 9 |
| | Net power | | MW | 23 |
| Total simple cycle electricity | | | MW | 266 |
| Total simple cycle thermal efficiency | | | — | 40.3% |
| Bottom cycle | Total heat from topping cycle | | MW | 366 |
| | Heat available for superheat (above 1000 F.) | | MW | 51 |
| | Maximum temperature available | | F. | 1,717 |
| | Assumed thermal efficiency | | — | 42% |
| | Electricity produced | | MW | 154 |
| Total electricity produced | | | MW | 419 |
| Total combined cycle thermal efficiency (LHV) | | | — | 63.7% |

In a second operation of the cycle, oxygen-deficient air (O$_2$ content is about 15%) was used as an oxidant and nitrogen cooling was applied in the partial oxidation gas turbine. Calculated results of the major performance parameters for this operation of the cycle are shown in Table 2. In both operations, cycle thermal efficiency is above 63% LHV and the cycle thermal efficiency is about 1% higher for the second operation of the cycle.

Table 3 shows the calculated results of the major performance

TABLE 2

| Combined Cycle, POGT-GT in parallel, O2 = 15% and nitrogen cooling. | | | | |
|---|---|---|---|---|
| SGT-6000 | NG input | | lb/hr | 83,552 |
| | | | Btu/hr(HHV) | 1,994,151,778 |
| | | | Btu/hr(LHV) | 1,797,122,416 |
| | | | MW (LHV) | 526.6 |
| | Air input | | lb/hr | 4,529,718 |
| | TIT | | F. | 2,415 |
| | Pressure ratio | | — | 19.1 |
| | GT flowrate | | lb/hr | 4,171,097 |
| | Exhaust temperature | | F. | 1,031 |

TABLE 2-continued

Combined Cycle, POGT-GT in parallel, O2 = 15% and nitrogen cooling.

| | | | |
|---|---|---|---:|
| | Expander work | MW | 492.0 |
| | Compressor work | MW | 249.2 |
| | Net power | MW | 242.8 |
| SGT-400 POGT | NG input | lb/hr | 20,890 |
| | | Btu/hr(HHV) | 498,587,799 |
| | | Btu/hr(LHV) | 449,325,533 |
| | | MW (LHV) | 131.7 |
| | Oxidant input | lb/hr | 276,981 |
| | Oxygen content | vol % | 15% |
| | Total steam flow | lb/hr | 10,445 |
| | Cooling nitrogen flow | lb/hr | 100,579 |
| | TIT | F. | 2,278 |
| | Pressure ratio | — | 16.2 |
| | Exhaust temperature | F. | 998 |
| | POGT flowrate | lb/hr | 353,939 |
| | Expander work | MW | 43.6 |
| | Compressor work | MW | 20.4 |
| | Net power | MW | 23.2 |
| Total simple cycle electricity | | MW | 266.0 |
| Total simple cycle thermal efficiency | | — | 40.4% |
| Bottom cycle | Total heat from topping cycle | MW | 378.9 |
| | Heat available for superheat (above 1000 F.) | MW | 39.2 |
| | Maximum temperature available | F. | 1,583 |
| | Assumed thermal efficiency | — | 42% |
| | Electricity produced | MW | 159.1 |
| Total electricity produced | | MW | 425.2 |
| Total combined cycle thermal efficiency (LHV) | | — | 64.6% | parameters for the gas turbine-partial oxidation gas turbine combined cycle in accordance with the embodiment of FIG. 3. Calculated results for operation of the gas turbine-partial oxidation gas turbine combined cycle in series in accordance with the embodiment shown in FIG. 4 are shown in Table 4 in which oxygen concentration is about 15% and nitrogen cooling is employed. As can be seen, total system thermal efficiency for both calculated cases is in the range of about 61-64% LHV.

TABLE 3

Combined Cycle, POGT-GT in parallel with H2 separation, O2 = 21% and steam cooling

| | | | |
|---|---|---|---:|
| POR-6000 | NG input | lb/hr | 110,491 |
| | | Btu/hr(HHV) | 2,637,112,355 |
| | | Btu/hr(LHV) | 2,376,556,178 |
| | | MW (LHV) | 696.3 |
| | Steam input | lb/hr | 77,344 |
| | Air input | lb/hr | 643,021 |
| SGT-6000 | SGT input | lb/hr | 821,549 |
| | | Btu/hr(HHV) | 1,671,395,008 |
| | | Btu/hr(LHV) | 1,512,196,750 |
| | | MW (LHV) | 443.1 |
| | Air input | lb/hr | 4,435,273 |
| | TIT | F. | 2,415 |
| | Pressure ratio | — | 19.1 |
| | GT flowrate | lb/hr | 4,171,629 |
| | Exhaust temperature | F. | 1,042 |
| | Expander work | MW | 495.1 |
| | Compressor work | MW | 244.0 |
| | Net power | MW | 251.1 |
| SGT-400 POGT | Hydrogen input | lb/hr | 9,306 |
| | | Btu/hr(HHV) | 566,855,822 |
| | | Btu/hr(LHV) | 479,610,151 |
| | | MW (LHV) | 140.5 |
| | Air input | lb/hr | 62,358 |
| | Steam input | lb/hr | 19,386 |
| | TIT | F. | 2,280 |
| | Pressure ratio | — | 16.2 |
| | POGT flowrate | lb/hr | 84,055 |
| | Exhaust temperature | F. | 1,019 |
| | Expander work | MW | 20.5 |
| | Air compressor work | MW | 3.3 |
| | Hydrogen compressor work | MW | 4.6 |
| | Net Power | MW | 12.6 |

TABLE 3-continued

Combined Cycle, POGT-GT in parallel with
H2 separation, O2 = 21% and steam cooling

| | | | |
|---|---|---|---:|
| Total simple cycle electricity | | MW | 263.7 |
| Total simple cycle thermal efficiency | | — | 37.9% |
| Bottom cycle | Total heat from topping cycle | MW | 390.9 |
| | Heat available for superheat (above 1000 F.) | MW | 90.2 |
| | Maximum temperature available | F. | 2,031 |
| | Assumed thermal efficiency | — | 42.0% |
| | Electricity produced | MW | 164.2 |
| Total electricity produced | | MW | 427.9 |
| Total combined cycle thermal efficiency (LHV) | | — | 61.4% |

TABLE 4

Combined Cycle, POGT-GT in series, O2 = 15% and nitrogen cooling.

| | | | |
|---|---|---|---:|
| HP POGT | NG input | lb/hr | 112,529 |
| | | Btu/hr(HHV) | 2,568,940,773 |
| | | Btu/hr(LHV) | 2,319,253,011 |
| | | MW (LHV) | 679.7 |
| | O$_2$-deficient air input | lb/hr | 963,047 |
| | Oxygen concentration | vol % | 15% |
| | Total steam/waterflow | lb/hr | 56,265 |
| | TIT | F. | 1,900 |
| | Pressure ratio | — | 4.0 |
| | POGT flow rate | lb/hr | 1,131,841 |
| | Exhaust temperature | F. | 1,296 |
| | Expander work | MW | 75.6 |
| | Compressors + pump work | MW | 36.5 |
| | Net power | MW | 39.1 |
| SGT-6000 | SGT input | lb/hr | 1,131,841 |
| | | Btu/hr(HHV) | 2,031,353,993 |
| | | Btu/hr(LHV) | 1,820,967,643 |
| | | MW (LHV) | 533.7 |
| | Air input | lb/hr | 3,481,457 |
| | TIT | F. | 2,415 |
| | Pressure ratio | — | 19.1 |
| | GT flow rate | lb/hr | 4,171,125 |
| | Exhaust temperature | F. | 1,045 |
| | Expander work | MW | 501 |
| | Compressor work | MW | 245 |
| | Net power | MW | 256 |
| Total simple cycle electricity | | MW | 295 |
| Total simple cycle thermal efficiency | | — | 43.4% |
| Bottom cycle | Total heat from topping cycle | MW | 356.5 |
| | Maximum temperature available | F. | 1,046 |
| | Assumed thermal efficiency | — | 35.0% |
| | Electricity produced | MW | 124.8 |
| Total electricity produced | | MW | 419.7 |
| Total combined cycle thermal efficiency (LHV) | | — | 61.8% |

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for generation of electric power comprising the steps of:
    providing a first fuel and a first oxidant to a gas turbine, generating a first portion of electric power and a hot oxidant;
    providing a second fuel and a second oxidant to a partial oxidation gas turbine operating in parallel with said gas turbine, generating a second portion of electric power and a hot syngas; and
    providing said hot oxidant and said hot syngas to a bottoming cycle, generating a third portion of electric power.

2. The method of claim 1, wherein said first fuel and said second fuel are the same fuel type.

3. The method of claim 2, wherein said first fuel is provided to said gas turbine in an amount of at least 80% of a total amount of said first fuel and said second fuel.

4. The method of claim 1, wherein said gas turbine is operated at an oxidant/fuel ratio in a range of about 2.5 to about 3.0 of a stoichiometric ratio of said oxidant and said first fuel.

5. The method of claim 1, wherein said partial oxidation gas turbine is operated at an oxidant/fuel ratio in a range of about 0.32 about 0.6 of a stoichiometric ratio of said oxidant and said second fuel.

6. The method of claim 1, wherein said first fuel is provided to a first stage partial oxidation reactor, producing a syngas comprising CO and H$_2$.

7. The method of claim 6, wherein at least a portion of said $H_2$ is removed from said syngas, producing a reduced-$H_2$ syngas.

8. The method of claim 7, wherein said second fuel comprises $H_2$ removed from said syngas.

9. The method of claim 1, wherein said bottoming cycle comprises a fuel-fired boiler.

10. The method of claim 9, wherein oxidant is compressed, preheated and then provided to one of a gas turbine and a partial oxidation gas turbine.

11. The method of claim 10, wherein said compressed oxidant is preheated in two stages, a first stage using heat from a gas turbine exhaust and a second stage using heat from said fuel-fired boiler.

12. The method of claim 1, wherein said second oxidant is oxygen-deficient air.

13. A method for generation of electric power comprising the steps of:
providing a first portion of a fuel and a first portion of an oxidant to a gas turbine, generating a first portion of electric power and a hot oxidant;
providing a second portion of said fuel and a second portion of said oxidant to a partial oxidation gas turbine operating in parallel with said gas turbine, generating a second portion of electric power and a hot syngas; and
providing said hot oxidant and said hot syngas to a bottoming cycle, generating a third portion of electric power.

14. The method of claim 13, wherein said first portion of the fuel comprises at least about 80% of a total amount of said fuel and said second portion of said fuel comprises up to about 20% of the total amount of said fuel.

15. The method of claim 13, wherein said oxidant is oxygen-deficient air.

16. The method of claim 13, wherein said bottoming cycle comprises a fuel-fired boiler.

17. The method of claim 16, wherein oxidant is compressed, preheated and then provided to one of a gas turbine and a partial oxidation gas turbine.

18. The method of claim 17, wherein said compressed oxidant is preheated in two stages, a first stage using heat from a gas turbine exhaust, and a second stage using heat from said fuel-fired boiler.

19. The method of claim 13, wherein said gas turbine is operated at an oxidant/fuel ratio in a range of about 2.5 to about 3.0 of the stoichiometric ratio of said first portion of oxidant and said first portion of said fuel.

20. The method of claim 13, wherein said partial oxidation gas turbine is operated at an oxidant/fuel ratio in a range of about 0.32 about 0.6 of the stoichiometric ratio of said second portion of said oxidant and said second portion of said fuel.

21. An apparatus for generation of electric power comprising:
a first stage gas turbine having a first stage fuel inlet, a first stage oxidant inlet, and a hot oxidant outlet, said first stage gas turbine generating a first portion of electric power;
a second stage partial oxidation gas turbine operating in parallel with said gas turbine having a second stage fuel inlet, a second stage oxidant inlet, and a hot syngas outlet, said second stage partial oxidation gas turbine generating a second portion of electric power;
a fuel-fired steam generator having a hot oxidant inlet in fluid communication with said hot oxidant outlet and a hot syngas inlet in fluid communication with said hot syngas outlet; and
a steam turbine operably connected with said fuel-fired steam generator,
wherein said fuel-fired steam generator and said steam turbine generating a third portion of electric power.

22. The apparatus of claim 21, wherein said first stage gas turbine is operably connected with a first stage air compressor having a first stage compressed air outlet and said second stage partial oxidation gas turbine is operably connected with a second stage air compressor having a second stage compressed air outlet.

23. The apparatus of claim 22 further comprising a first stage air recuperator having a first stage compressed air inlet in fluid communication with said first stage compressed air outlet, having a first stage recuperator hot oxidant inlet in fluid communication with said first stage hot oxidant outlet, having a heated compressed air outlet, and having a reduced temperature oxidant outlet;
a heat recovery steam generator having a reduced temperature oxidant inlet in fluid communication with said reduced temperature oxidant outlet, having a water inlet, and having a steam outlet;
a second stage air recuperator having a second stage heated compressed air inlet in fluid communication with said heated compressed air outlet and having a second stage heated air outlet in fluid communication with said first stage gas turbine; and
a steam superheater having a steam inlet in fluid communication with said steam outlet and having a superheated steam outlet in fluid communication with a steam turbine generator.

24. The apparatus of claim 23, wherein said second stage air recuperator and said steam superheater are integral with said fuel-fired steam generator.

25. The apparatus of claim 21, wherein said fuel-fired steam generator includes at least one of a steam and hot water outlet in fluid communication with said second stage partial oxidation gas turbine.

26. The apparatus of claim 21, wherein said first stage gas turbine comprises a combustor having two stages, a first stage of which is a first stage partial oxidation reactor and a second stage of which is a complete combustion combustor.

27. The apparatus of claim 26 further comprising hydrogen separation means having a syngas inlet in fluid communication with said first stage partial oxidation reactor and having a reduced hydrogen syngas outlet in fluid communication with said complete combustion combustor.

28. The apparatus of claim 27, wherein said fuel-fired steam generator includes at least one of a steam and water outlet in fluid communication with said first stage partial oxidation reactor.

29. The apparatus of claim 28, wherein said hydrogen separation means includes a hydrogen outlet in fluid communication with said second stage partial oxidation gas turbine.

* * * * *